United States Patent [19]

Spinner et al.

[11] Patent Number: 5,056,591
[45] Date of Patent: Oct. 15, 1991

[54] METHOD AND APPARATUS FOR CONDUCTING A THERMOCHEMICAL ABSORPTION AND DESORPTION REACTION BETWEEN A GAS AND A SOLID

[75] Inventors: Bernard Spinner, Corneilla del Vercol; Sylvain Mauran, Espira de l'Agly; Alain Roca, Perpignan; Marianne Balat, Saleilles, all of France

[73] Assignee: Societe Nationale Elf Aquitaine, Courbevoie, France

[21] Appl. No.: 239,666

[22] Filed: Sep. 2, 1988

[30] Foreign Application Priority Data

Sep. 7, 1987 [FR] France .................. 87 12388

[51] Int. Cl.$^5$ .............................................. F25B 17/00
[52] U.S. Cl. ............................ 165/104.16; 62/46.2; 62/480
[58] Field of Search ............. 165/104.12; 62/480, 62/46.2

[56] References Cited

U.S. PATENT DOCUMENTS

| | | | |
|---|---|---|---|
| 2,068,891 | 1/1937 | Scholl . | |
| 4,039,023 | 8/1977 | McClaine | 165/104.12 |
| 4,183,734 | 1/1980 | Leppard et al. . | |
| 4,411,384 | 10/1983 | Dunlap . | |
| 4,610,148 | 9/1986 | Shelton . | |
| 4,784,217 | 11/1988 | Payre | 165/104.12 |

FOREIGN PATENT DOCUMENTS

| | | |
|---|---|---|
| 0001496 | 4/1979 | European Pat. Off. . |
| 0202662 | 11/1986 | European Pat. Off. . |
| 2808876 | 9/1979 | Fed. Rep. of Germany . |
| 0683767 | 3/1930 | France . |
| 2393247 | 12/1978 | France . |
| 2526926 | 11/1983 | France . |

OTHER PUBLICATIONS

K. Nesselman, *Wissenschaftliche Veroffenlichung Siemons-Konzern*, vol. 12, No. 12, pp. 89-109 (1933).

*Primary Examiner*—Albert W. Davis, Jr.
*Attorney, Agent, or Firm*—Oblon, Spivak, McClelland, Maier & Neustadt

[57] ABSTRACT

A method is provided of conducting a thermochemical absorption or desorption reaction between a gas and a solid in the presence of a heat-carrying fluid in a closed enclosure. This method comprises a first step in which, for the pressure prevailing in the reactor, the variation of the mean power of the reaction is determined as a function of the difference which exists between the temperature of the heat-carrying fluid and the equilibrium temperature of the reaction, given by the Clapeyron diagram, for defining an optimum zone in which the reaction takes place with maximum mean power, and a second step in which the reaction takes place, in which a reference temperature is imposed on the heat-carrying fluid such that the reaction takes place in the optimum zone.

8 Claims, 3 Drawing Sheets

METHOD AND APPARATUS FOR CONDUCTING A THERMOCHEMICAL ABSORPTION AND DESORPTION REACTION BETWEEN A GAS AND A SOLID

The present invention relates to a method of conducting a thermochemical absorption and desorption reaction between a gas and a solid. The principle of such reactions is known and finds a particular application in the construction of thermochemical heat pumps or heat storage devices such as described in French patent No. 2 547 512: "Method of implementing a gas-solid reaction", or else in the French patent No. 2 548 340 entitled "Three phase heat pump", or else in the French patent No. 2 582 790 entitled "Thermochemical method and device of storing and destoring heat".

The thermodynamics of such reactions is perfectly well known to a skilled technician and in particular to one who knows the curves giving the evolution of the equilibrium temperature as a function of the pressure of the gas, which curves are known under the name of Clapeyron diagram. These diagrams are very useful for conducting a reaction for they make it possible, for a given pressure, to evaluate the temperature at equilibrium and, for a given temperature, to know what reaction will take place and under what conditions this reaction will take place. At the sight of these diagrams, it is obvious for a man skilled in the art that for such a reaction to take place a temperature is required which is different from the equilibrium temperature.

During the conduction of such reactions, the choice of the reaction temperature, which is often determined by the temperature of a heat-carrying fluid permitting a heat exchange between the reaction medium and the outside, is very important. In fact, this temperature will first of all determine the heat to be supplied for conducting the reaction and then the reaction speed.

An object of the present invention is to provide a method which makes it possible on the one hand to choose a reference temperature which is the best possible and, on the other, to conduct the reaction with maximum power.

For that, the invention provides a method of conducting a thermochemical absorption or desorption reaction between a gas and a solid in the presence of a heat-carrying fluid, which reaction permits a heat exchange between the reaction medium and an external medium, said reaction taking place in a closed enclosure, this method being characterized in that it comprises:

a first step in which, for the pressure prevailing in the reactor, the variation of the mean power of the reaction is determined as a function of the difference between the temperature of the heat-carrying fluid and the equilibrium temperature of the reaction, given by the Clapeyron diagram, thus making it possible to define an optimum zone in which the reaction takes place with maximum mean power, and a second step in which the reaction is conducted, in which a reference temperature is imposed on the heat-carrying fluid so that the reaction takes place in the optimum zone.

In a first embodiment of the invention, the reference temperature at which the reaction is conducted is chosen experimentally equal to a value such that the reaction takes place in the optimum zone, and the reaction is conducted with a constant pressure, equal to the equilibrium pressure.

In a second embodiment; the reaction is conducted at a reference temperature close to the equilibrium temperature and with a pressure variable between the starting pressure and the equilibrium pressure corresponding to said reference temperature.

For that, the method consists in, first of all, conducting the reaction in a closed enclosure so that the pressure may vary up to said pressure determined by the reference temperature, then the reaction is conducted in an open enclosure for reaching the initial pressure.

In a third embodiment of the invention, said reaction is conducted mainly between a pressure equal to the equilibrium pressure corresponding to the chosen reference temperature and a pressure higher than the pressure corresponding to the equilibrium of the reaction.

For these three embodiments, the pressure corresponding to the equilibrium of the reaction is the pressure which prevails in the reactor associated with the reactor in which the reaction takes place.

But the invention and its advantages will be better understood from the following examples given by way of non-limitative illustration with reference to the accompanying figures in which.

Figure 1:
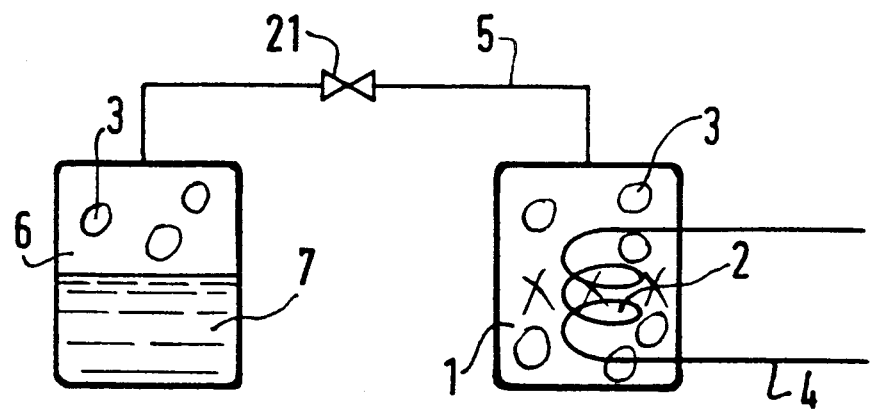
FIG. 1 shows a thermochemical heat pump of the invention.

In FIG. 1 a first reactor 1 has been shown in which a reaction takes place between a solid 2 and a gas 3 in the presence of a heat-carrying fluid flowing through an exchanger 4. This reactor is connected by a pipe 5 to an associated reactor 6 in which a reaction takes place between the gas 3 and its associated liquid phase 7.

Figure 2:
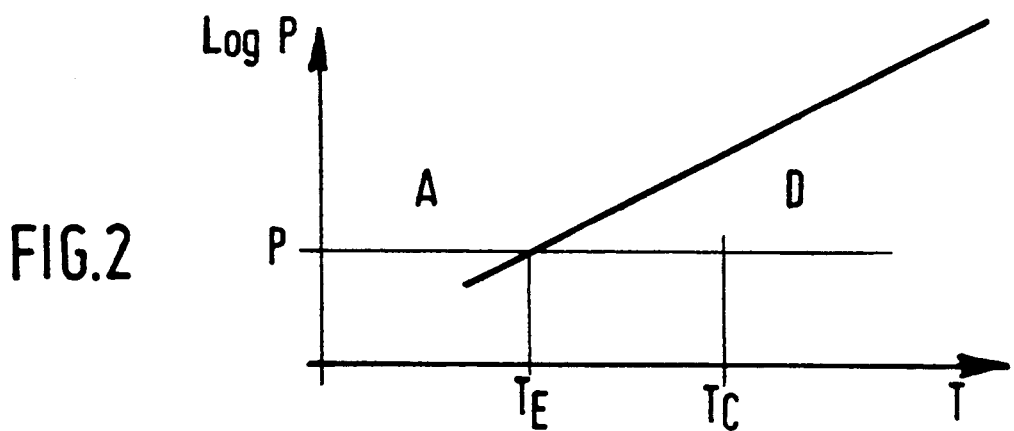
FIGS. 2, 4 to 8 are Clapeyron diagrams.

In FIG. 2 the Clapeyron diagram has been shown of the reaction between the gas and the solid taking place in the reactor 1. This diagram shows the variations of the logarithm of the pressure as a function of the temperature. This variation is represented by a straight line which divides the space into two parts A and D. For the temperature and pressure pairs chosen in space D, a desorption reaction between the gas and the solid will be obtained, if a pressure is chosen different from the corresponding equilibrium pressure. Similarly, for a chosen pair in space A and a pressure different from the equilibrium pressure corresponding to this temperature, an absorption reaction will be obtained between said gas and said solid.

Figure 3:
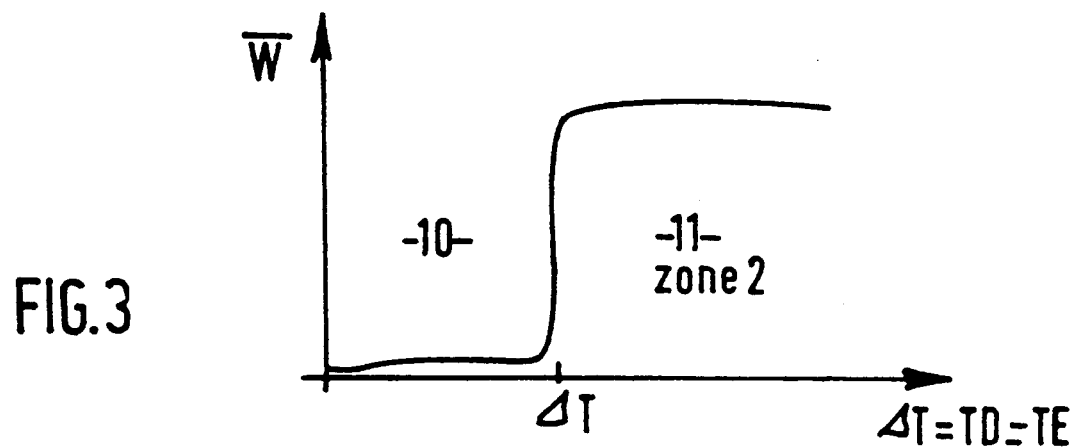
FIG. 3 shows the variation of the mean power of the variation as a function of the temperature difference.

In FIG. 3, for the same reaction, the variation has been shown of the mean power of the reaction was a function of the temperature difference existing for a given pressure between the equilibrium temperature and the reference temperature, namely the temperature of the heat-carrying fluid flowing through the coil 4.

These measurements were made for an advancing rate of the reaction equal to 0.8. In the curve of FIG. 3 a zone 10 will be noted named zone I for which the mean power is very low and a zone II (11) for which the mean power is substantially maximum, corresponding to the optimum zone.

Figure 4:
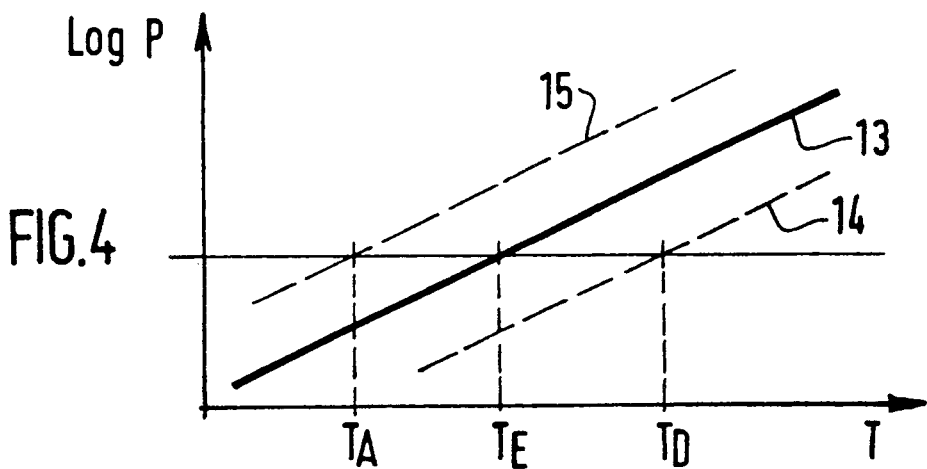

It will be readily understood that, in accordance with the invention, a temperature for the heat-carrying fluid will be chosen such that the reaction takes place mainly in zone II. FIG. 4, similar to FIG. 2, comprises in addition to the equilibrium curve 13 a straight line 14 which is parallel thereto and offset by a value Te - Id corresponding substantially to the delta T shown in FIG. 3. The same curve 15 has also been shown corresponding to the same values but for the reverse reaction.

For the desorption reaction, the optimum zone of FIG. 3 corresponds to the space which is situated at the right of the straight line 14 shown in FIG. 4.

Figure 5:
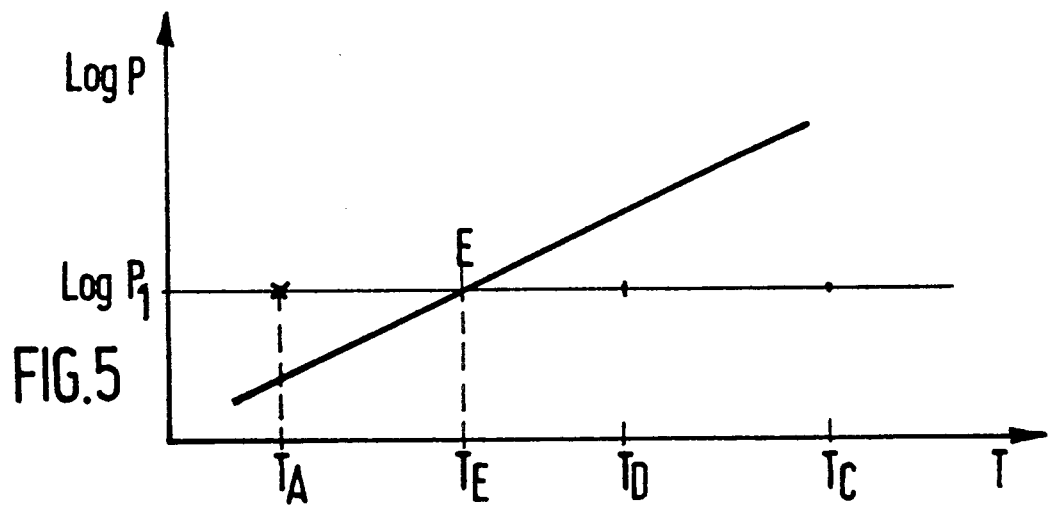

Referring to the Clapeyron diagram shown in FIG. 5, the operation of the systems will be explained with reference to the first embodiment of the invention. First of all, referring to FIG. 1, it will be recalled that in a first phase, called absorption phase, the liquid medium 7 contained in the reactor 6 evaporates and produces the gas 3 which penetrates through pipe 5 into the reactor 1, comes into contact with the solid 2 so as to create an absorption reaction of the gas on this solid. These two reactions form the first operating cycle of the system. During the second cycle, the reverse reactions take place. To explain the operation of the method of the invention, it will be assumed that a first cycle has been conducted and that in reactor 1 is to be found a solid having absorbed gas. At the initial moment, we have a temperature Ta and a pressure P1. This temperature Ta is necessarily less than the equilibrium temperature Te. To initiate the second cycle and thus create the desorption reaction between the gas and the solid, it is necessary to bring reactor 1 up to a reference temperatire Tc greater than Te. In the first embodiment of the invention, this temperature Tc was chosen equal to a value appreciably greater than the value Td.

In a first stage, reactor and its contents will be heated until the equilibrium temperature is reached. As the temperature gradually becomes greater than the equilibrium temperature, the desorption reaction will take place then, when the reaction is finished, the temperature inside the reactor will rise so that a thermal equilibrium is obtained between the constituents of this reactor and the heat-carrying fluid at temperature Tc. Depending on the kinetics used, the reaction takes place for a temperature zone between Te and Td and for a temperature zone greater than Td.

Thus, a reaction is obtained at least a part of which takes place in zone II shown with reference 11 in FIG. 3, namely in the zone where the mean power is maximum.

However, in this embodiment, it is necessary to choose a fairly high reference temperature, which may adversely affect the industrial use of such a reaction, and furthermore a part of the reaction takes place nevertheless in zone I, namely in a zone where the energy yield is not satisfactory.

Figure 6:
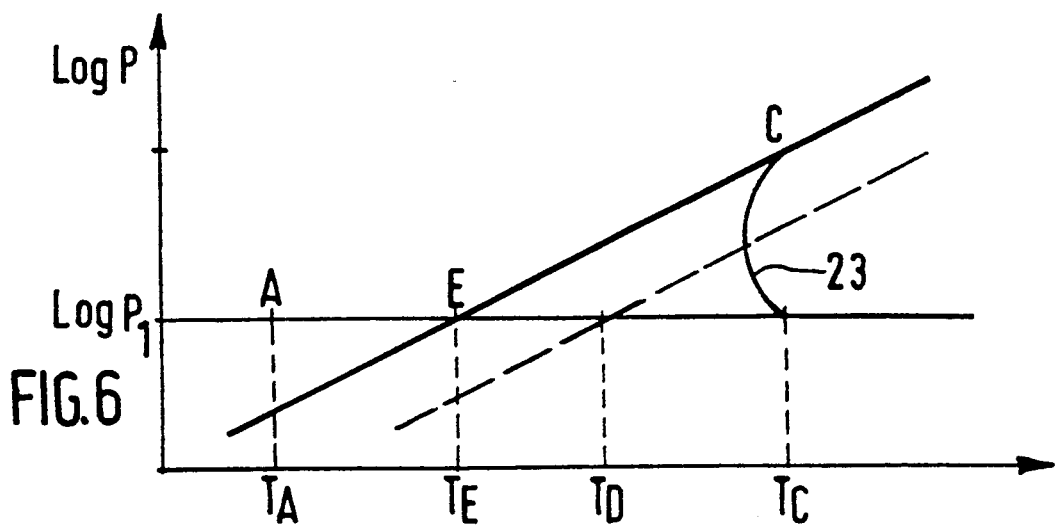

Referring to FIG. 6 which is a figure identical to FIG. 5 which has then the same references when the values are identical, the second embodiment of the invention will be explained, this embodiment requiring in the installation shown in FIG. 1 the presence of a valve 21 in pipe 5. On initialization of the desorption cycle, the absorption reaction is finished and reactor 1 is at temperature Ta and pressure P1. This reactor 1 is isolated from reactor 6 by closure of valve 21. The reference temperature T is chosen equal to Tc, greater than Td, the temperature inside reactor 1 increases then up to the equilibrium temperature Te then, from this equilibrium, the pressure increases up to pressure PC, which is determined as being the equilibrium pressure for temperature Tc. When the pressure reaches this pressure Tc, valve 21 is opened so that a pressure equilibrium occurs between the two reactors. From this moment, the reaction takes pace and the temperature inside reactor 1 follows the path shown by reference 23 as the pressure inside this reactor decreases to reach pressure P1. In this embodiment, it will be noted that a large part of the reaction takes place in zone II for which this embodiment provides maximum yield while having a reference temperature Tc closer to the desorption temperature Td.

Figure 7:
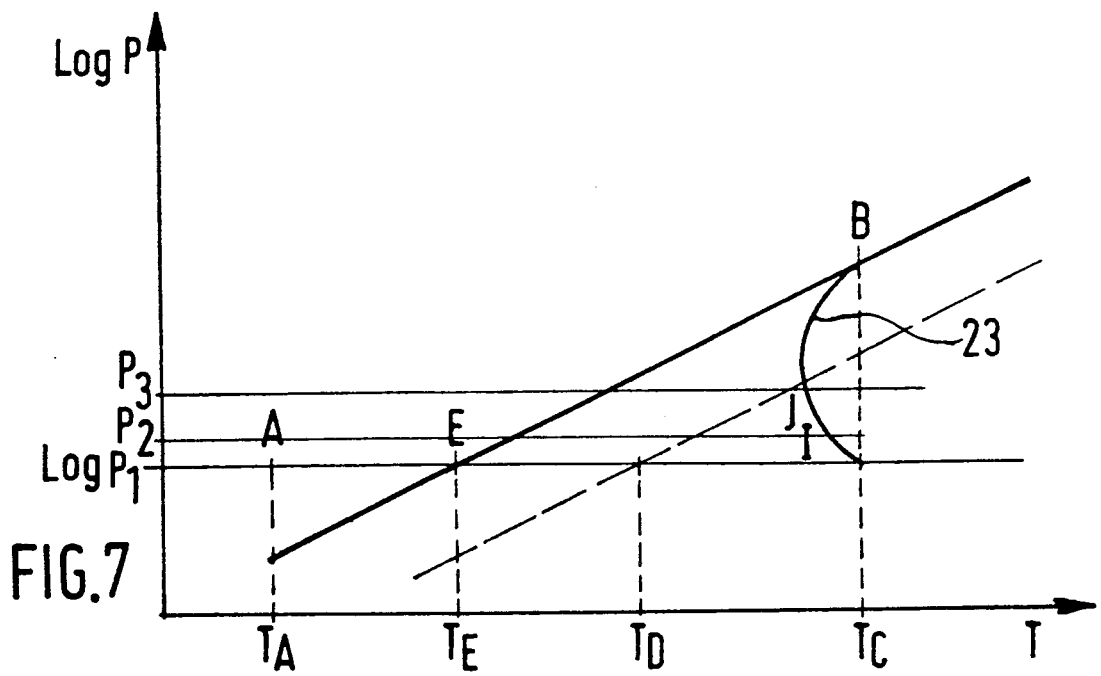

Referring to FIG. 7, which is identical to FIG. 6, an improvement of the preceding method will be explained. This improvement consists in closing valve 21 when the pressure reaches a pressure P2 for which the temperature of reactor 1 is shown by point I on curve 23, letting the pressure in reactor 1 increase up to pressure P3 and then opening valve P3, this value P3 corresponding to point J on curve 23. The advantage of this method resides in the fact that the majority of the reaction takes place in zone II, which zone corresponds to a mean power maximum. In addition, the reference temperature may be chosen very close to the desorption temperature Td. To apply this method, a manual system may be used or a system comprising an electrovalve in place of the valve 21 and a pressure sensor for controlling the electrovalve as a function of the pressure prevailing in the reactor. But also a programmed system may be used for controlling the electrovalve, this system making it possible to avoid appreciable overall power peaks since the regulation then takes place by a succession of small peaks.

Figure 8:
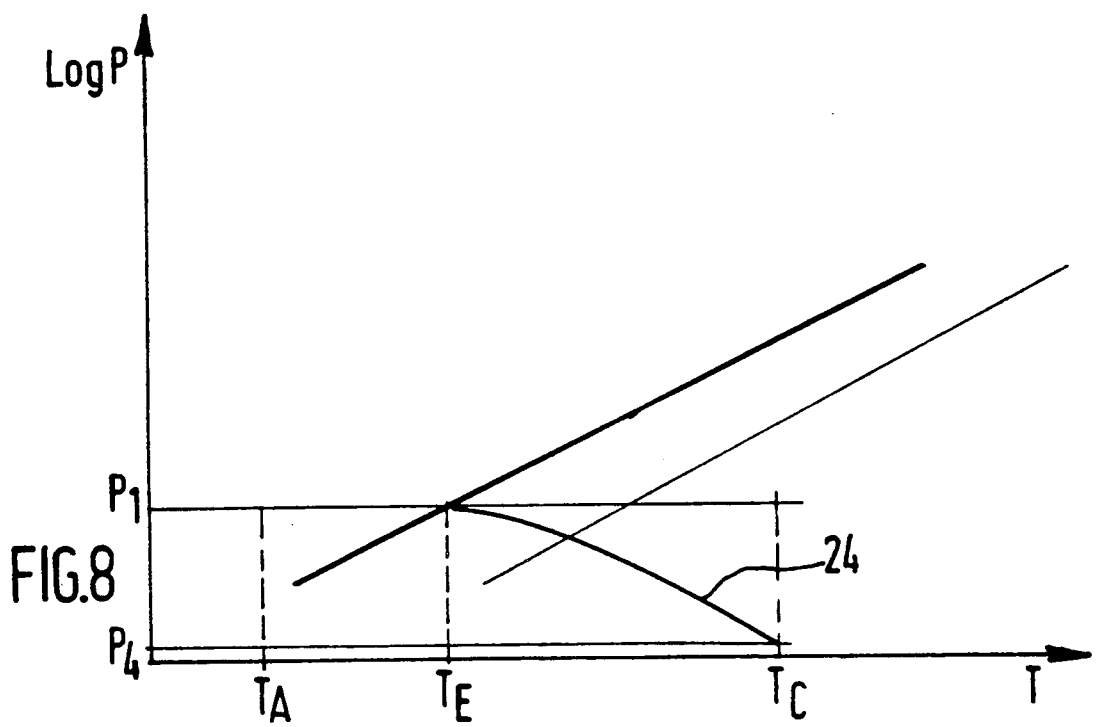

Referring to FIG. 8, another embodiment of the invention will be explained, this embodiment requiring the presence in duct 5 of a circulator or compressor, to replace valve 21, so as to create a depression in reactor 1 and consecutively an overpressure in reactor 6. As before, after absorption, the temperature in reactor 1 is equal to temperature Ta. The temperature in this reactor increases up to the equilibrium temperature. At this time, the circulator is started up so that the pressure in reactor 1 decreases and reaches the pressure shown by P4 so that the temperature in this reactor during the desorption reaction follows the profile 24 which shows that the majority of the reaction takes place in zone II.

For implementing these embodiments of the invention, any known system may be used for controlling valve 21 as a function of the advance of the reaction in a reactor, but a probe may also be used such as described in the patent application filed concurrently herewith by the Applicant and entitled: "A method of using a thermal shock probe, such a probe and application of the method".

But the invention is not limited to the embodiments described, it embraces, on the contrary, all variants thereof.

We claim:

1. Method of conducting a thermochemical absorption or desorption reaction between a gas and a solid in the presence of a heat-carrying fluid which reaction permits a heat exchange between the reaction medium and an external medium, said reaction taking place in an enclosure in contact with a second reactor which is the seat of a reaction using at least one gas, characterized in that it comprises:

a first step in which, for the pressure prevailing in the reactor, the variation of the mean power of the reaction is determined as a function of the difference which exists between the temperature of the heat-carrying fluid and the equilibrium temperature of the reaction, given by the Clapeyron diagram, thus making it possible to define an optimum zone in which the reaction takes place with maximum mean power, and a second step in which the reaction takes place, in which a reference temperature is imposed on the heat-carrying fluid such that the reaction takes place in the optimum zone.

2. Method according to claim 1, characterized in that the reference temperature at which the reaction is conducted is chosen experimentall y equal to a value such that the reaction takes place in the optimum zone, and the reaction is conducted with a constant pressure, equal to the pressure of the gas in the second reactor.

3. Method according to claim 1, characterized in that the reaction is conducted with a reference temperature close to the equilibrium temperature and with a pressure variable between a starting pressure and the equilibrium pressure corresponding to said reference temperature.

4. Method according to claim 3, characterized in that it consists in, first of all, conducting the reaction in a closed enclosure, varying the pressure up to the pressure determined by the reference temperature, then conducting the reaction in an open enclosure for reaching the initial pressure.

5. Method according to claim 1, characterized in that the reaction is conducted mainly between a pressure equal to the equilibrium pressure corresponding to the chosen reference temperature and a pressure higher than the pressure corresponding to the equilibrium of the reaction.

6. Method according to claim 1, characterized in that the reaction is conducted mainly between a pressure equal to the equilibrium pressure corresponding to the chosen reference temperature and a pressure less than the pressure corresponding to equilibrium of the reaction.

7. Method according to claim 4, 5 or 6, characterized in that the pressure is modified by a circulator or a compressor.

8. Method according to claim 1, characterized in that in that the reaction or reactions take place in a chemical heat pump.

* * * * *